US012182941B2

(12) United States Patent
Mason

(10) Patent No.: US 12,182,941 B2
(45) Date of Patent: Dec. 31, 2024

(54) SYSTEMS AND METHODS FOR STORING TRIANGULATIONS OF POLYGONAL MESH FACES

(71) Applicant: Electronic Arts Inc., Redwood City, CA (US)

(72) Inventor: Ashton Mason, Brighton (GB)

(73) Assignee: Electronic Arts Inc., Redwood City, CA (US)

( * ) Notice: Subject to any disclaimer, the term of this patent is extended or adjusted under 35 U.S.C. 154(b) by 138 days.

(21) Appl. No.: 17/977,259

(22) Filed: Oct. 31, 2022

(65) Prior Publication Data

US 2024/0144597 A1 May 2, 2024

(51) Int. Cl.
*G06T 17/20* (2006.01)
*G06T 17/10* (2006.01)

(52) U.S. Cl.
CPC .............. *G06T 17/20* (2013.01); *G06T 17/10* (2013.01)

(58) Field of Classification Search
CPC ................................ G06T 17/20; G06T 17/10
See application file for complete search history.

(56) References Cited

U.S. PATENT DOCUMENTS 6,016,153 A * 1/2000 Gueziec .................... G06T 9/40 345/441
6,184,897 B1 * 2/2001 Gueziec .................. G06T 17/20 345/440
6,996,505 B1 * 2/2006 Edelsbrunner ........ G06T 17/205 703/2
2005/0219245 A1 * 10/2005 Tao ......................... G06T 17/20 345/424
2015/0015577 A1 * 1/2015 Mason .................... G06T 17/30 345/420
2017/0046874 A1 * 2/2017 Mason .................. G06T 17/205
2020/0327719 A1 * 10/2020 Mason .................... G06T 17/10
2021/0232120 A1 * 7/2021 Marinov .................. B23Q 3/16
2023/0108967 A1 * 4/2023 Moreton ................. G06T 15/40 345/423

OTHER PUBLICATIONS

Mario Botsch, Mark Pauly, Leif Kobbelt, Pierre Alliez, Bruno Lévy, et al . . . Geometric Modeling Based on Polygonal Meshes. 2007. inria-00186820 (Year: 2007).*

(Continued)

*Primary Examiner* — Yu Chen
(74) *Attorney, Agent, or Firm* — Leydig, Voit & Mayer, Ltd.

(57) ABSTRACT

A method, device, and computer-readable storage medium for retrieving a stored triangulation of a polygonal mesh. The method includes: receiving an input polygonal mesh that is a computer representation of a three-dimensional (3D) object; identifying one or more faces of the input polygonal mesh that have more than three edges; retrieving for each face of the one or more faces, integer counts of a number of triangles that are incident to each vertex of the face stored in face-vertex properties of the face, wherein a specific triangulation of the face is represented by the number of triangles that are incident to each vertex of the face; and generating a triangulated polygonal mesh corresponding to the input polygonal mesh by triangulating, for each face of the one or more faces, the face based on the integer counts of the number of triangles that are incident to each vertex of the face.

17 Claims, 11 Drawing Sheets

(56) References Cited

OTHER PUBLICATIONS

Kettner, Lutz. "Halfedge Data Structures," The Computational Geometry Algorithms Library, CGAL Project, User and Reference Manual, Chapter 29 (Dec. 21, 2004) (available at: https://www.ics.uci.edu/~dock/manuals/cgal_manual/HalfedgeDS/Chapter_main.html).

Wikipedia. "Delaunay Triangulation," Wikipedia.org (Sep. 16, 2021) (available at: https://web.archive.org/web/20210928061914/https://en.wikipedia.org/wiki/Delaunay_triangulation).

Wikipedia. "Triangle Fan," Wikipedia.org (Nov. 6, 2014) (available at: https://web.archive.org/web/20210225181251/https://en.wikipedia.org/wiki/Triangle_fan).

* cited by examiner

SYSTEMS AND METHODS FOR STORING TRIANGULATIONS OF POLYGONAL MESH FACES

TECHNICAL FIELD

This disclosure generally relates to computer graphics and, more particularly, to systems and methods for storing triangulations of polygonal mesh faces.

BACKGROUND

For three-dimensional (3D) graphics applications, such as video games or animated films, efficient and consistent processing of data in a given operation is often useful. This is particularly the case in real-time applications, such as video games.

Various operations can be performed using computer generated objects in a scene. An object may be represented as a polygonal mesh, which comprises a collection of vertices, edges, and faces that define the shape and/or boundary of the object. The faces of the polygonal mesh may be triangles having three sides, quadrilaterals having four sides, or polygons having five or more sides.

In some implementations, multiple polygonal meshes can be authored for the same object. Each polygonal mesh of the multiple polygonal meshes may be a separately authored polygonal mesh that is a geometrically distorted version of the same topology. For example, the multiple polygonal meshes may represent the same object or character in different poses. The multiple polygonal meshes can be imported into a rendering system or game engine as a collection of polygonal meshes.

In one implementation, the game engine can perform various operations using the polygonal meshes. It is sometimes useful to maintain the original polygonal mesh topologies within the pipeline of the game engine. After the game engine processes the polygonal meshes, the rendering system can tie the processed polygonal meshes for the same object together by blending between the polygonal meshes to generate a pose for an animated object or character frame-by-frame. Many rendering systems, however, rely on the polygonal meshes being triangular polygonal meshes. Thus, any faces having four or more sides are triangulated by dividing such polygons into triangles. Various techniques can be used to triangulate a polygon, such as generating a triangle fan from a selected vertex or performing Delaunay triangulation to generate an optimized triangulation that, among other things, avoids thin or narrow triangles when possible.

One problem encountered by conventional rendering systems that blend between multiple polygonal meshes to generate a pose for an animated object or character is that the rendering system needs to be able to index into the multiple polygonal meshes consistently. If polygons of the polygonal mesh need to be triangulated before being processed by the rendering system, the triangulation should be consistent for a given face across each polygonal mesh of the multiple polygonal meshes. In some cases, a face can be triangulated in different ways. This can create a problem for the rendering system if a given face is triangulated differently for different polygonal meshes representing the same object, as the rendering system is no longer able to consistently index a given vertex or triangle among the multiple polygonal meshes when rendering.

As such, improved systems and methods for storing triangulations of polygonal mesh faces are needed.

SUMMARY

Embodiments of the disclosure provide a method, device, and computer-readable storage medium for retrieving a stored triangulation of a polygonal mesh. The method includes: receiving an input polygonal mesh that is a computer representation of a three-dimensional (3D) object; identifying one or more faces of the input polygonal mesh that have more than three edges; retrieving for each face of the one or more faces, integer counts of a number of triangles that are incident to each vertex of the face stored in face-vertex properties of the face, wherein a specific triangulation of the face is represented by the number of triangles that are incident to each vertex of the face; and generating a triangulated polygonal mesh corresponding to the input polygonal mesh by triangulating, for each face of the one or more faces, the face based on the integer counts of the number of triangles that are incident to each vertex of the face stored in the face-vertex properties.

DETAILED DESCRIPTION

Figure 1:
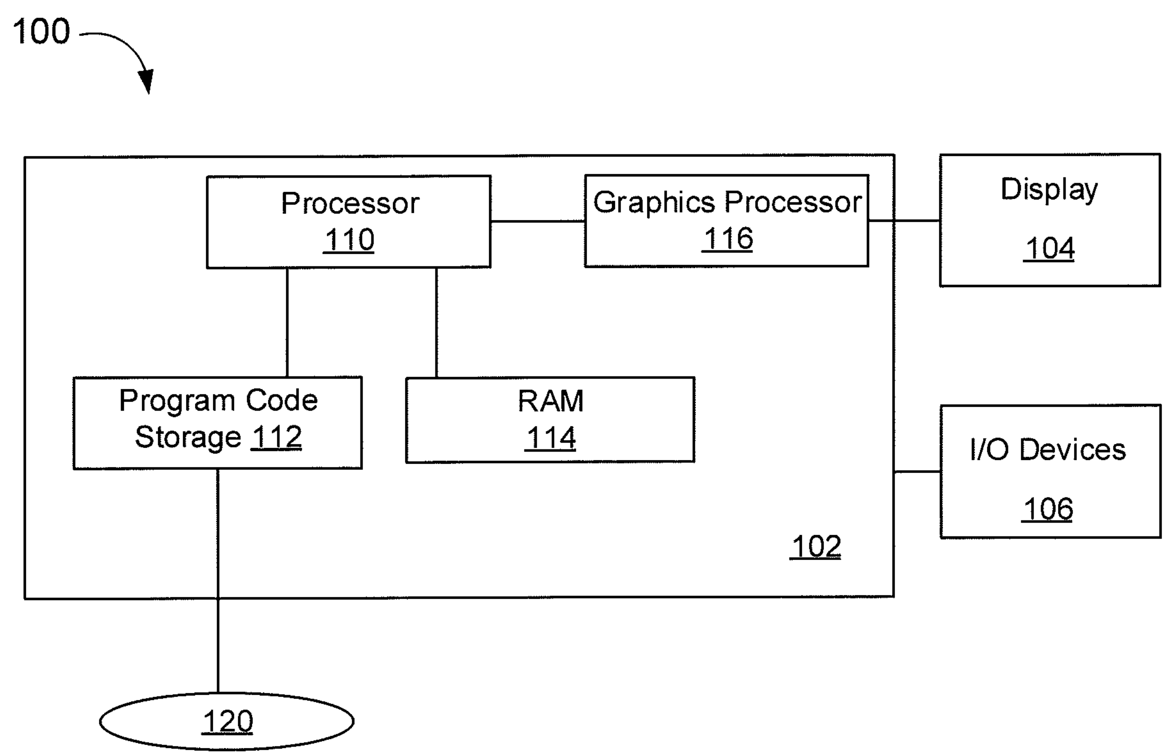
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide a system and method for storing triangulations of faces of polygonal meshes non-destructively, so they can be stored and retrieved without actually triangulating the faces. A disclosed method stores the triangulations efficiently in a single face-vertex property, without needing to explicitly store lists of triangles for each polygonal mesh face.

In some implementations, the need for storing triangulations of faces arises when there is a need to have triangulations of mesh faces available, without baking them in by actually triangulating the faces. For example, some implementations may import an artist-authored polygonal mesh with a mixture of polygonal faces of different kinds: triangles, quadrilaterals, and/or occasionally faces with five or more sides. Any non-triangular faces could simply be triangulated on import, but doing so would destroy the original non-triangular topology, making it no longer available to any processing performed on the polygonal mesh, for example, by a game engine, before the polygonal mesh is eventually rendered. Instead, embodiments of the disclosure elect to preserve the original polygonal mesh faces. In some embodiments, a single triangulation for each face is selected, and the rendering system is configured to use the selected triangulation consistently whenever triangles are required for polygonal mesh processing.

Some embodiments store exactly one item at each face, vertex, or edge element of a polygonal mesh, allowing the use of simple array-like containers with trivial constant-time access that can be addressed using a unique index of the face, vertex, or edge. For example, a half-edge data structure can be used to store polygonal mesh data. Once a triangulation is selected for a given face, for each vertex of the face, an integer count of the number of triangles incident on the vertex can be stored in a data structure (such as, for example, the half-edge data structure). The integer count can later be used by polygonal mesh processing tools, such as a rendering system, to consistently triangulate the polygonal mesh based on integer counts of the number of triangles incident on the respective vertices, as described in greater detail below.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

As described above, embodiments of the disclosure provide for storing arbitrary triangulations of polygonal mesh faces in a face-vertex property, such as by storing a single integer count at each vertex of each face.

In some implementations, the disclosed embodiments can be used to store triangulations on imported artist-authored polygonal meshes, so those triangulations can eventually be baked into the polygonal meshes prior to rendering. For example, the disclosed system and method can be used on import of assets that include multiple polygonal meshes representing the same object or character that are authored and imported together. The multiple polygonal meshes each have the same authored topology, but different geometry, e.g., they are morphs of a single polygonal mesh into different animated poses. By blending between the multiple polygonal meshes at runtime, the rendering system is able to animate a polygonal mesh by blending between the different poses represented by different polygonal meshes. Since the blending acts by indexing into the vertices and triangles of the triangulated polygonal meshes used for rendering, the blending depends on the meshes all being triangulated consistently. If the meshes are triangulated independently, the triangulation of faces can differ, especially where the 'same' face has a different shape in different polygonal meshes. By creating a single canonical triangulation of one polygonal mesh (for example, picked at random) on import, and storing the triangulation with each polygonal mesh of the multiple polygonal meshes, embodiments of the disclosure arrange to triangulate all the polygonal meshes consistently by embedding the stored triangulation in a face-vertex property into each polygonal mesh prior to rendering.

In other implementations, embodiments of the disclosure can be used to remember canonical triangulations of polygonal meshes provided by artists at import-time, allowing artists to control how their imported meshes are triangulated.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
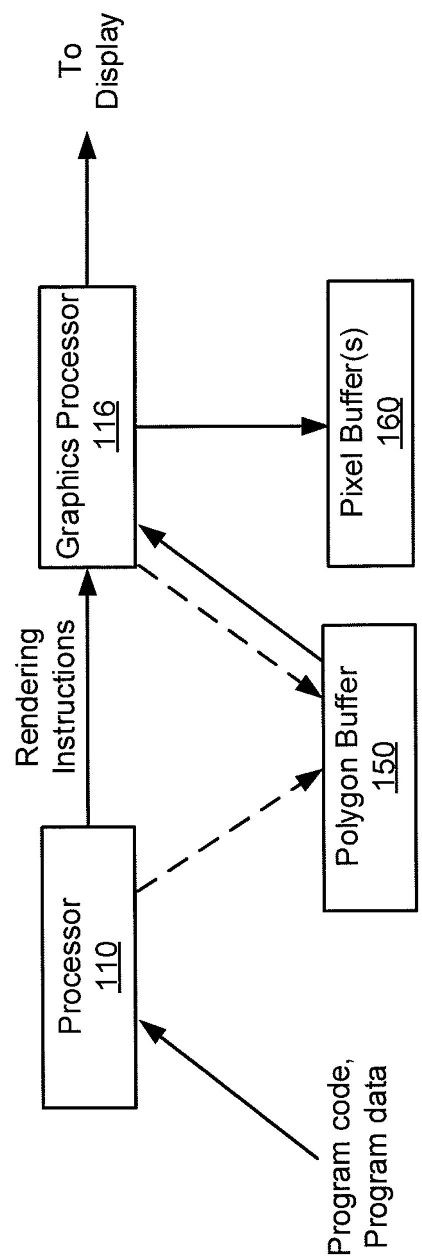
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
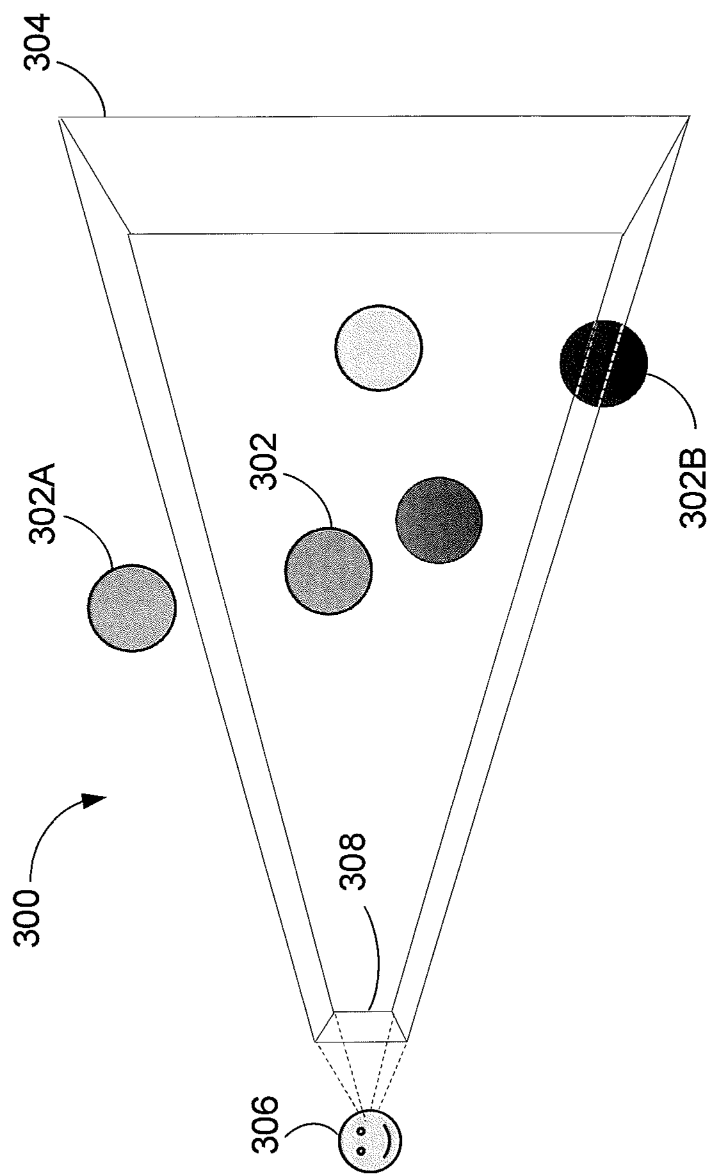
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

Figure 4B:
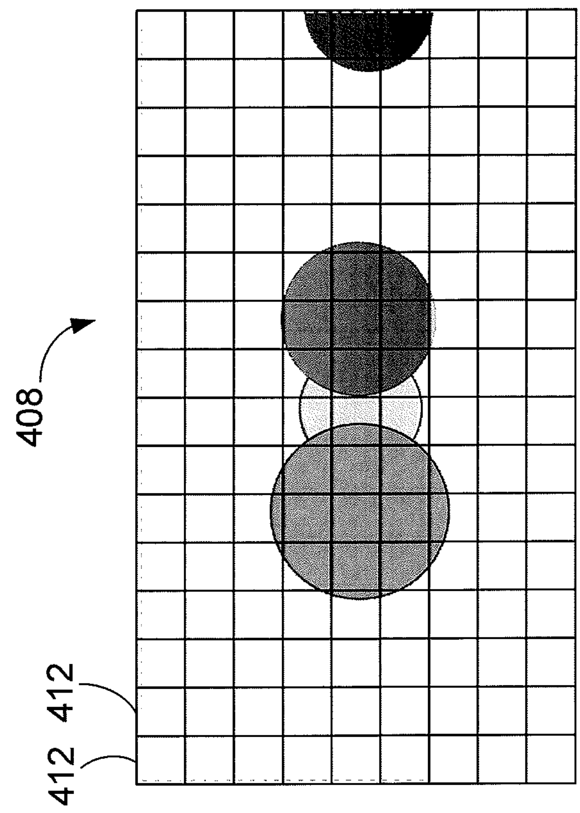
FIG. 4B is an example of an image of a scene, according to one embodiment.
Figure 4A:
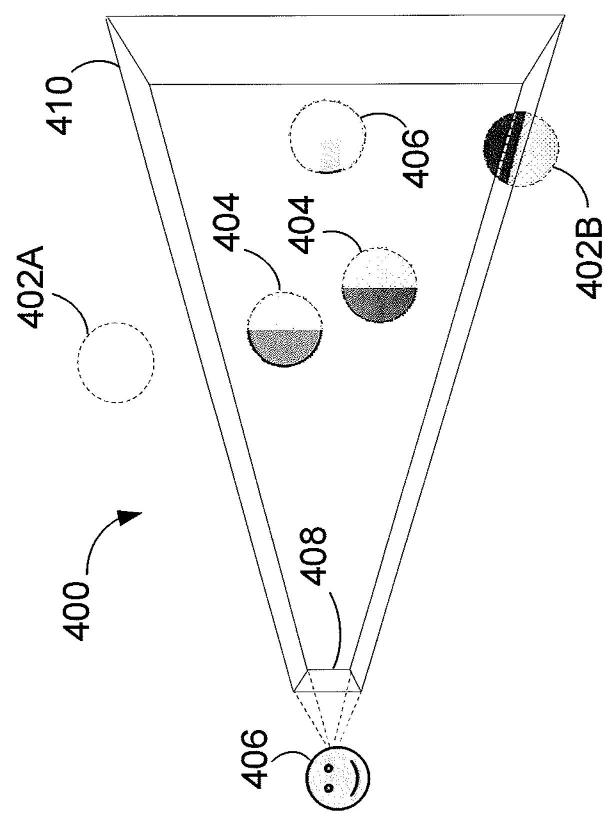
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
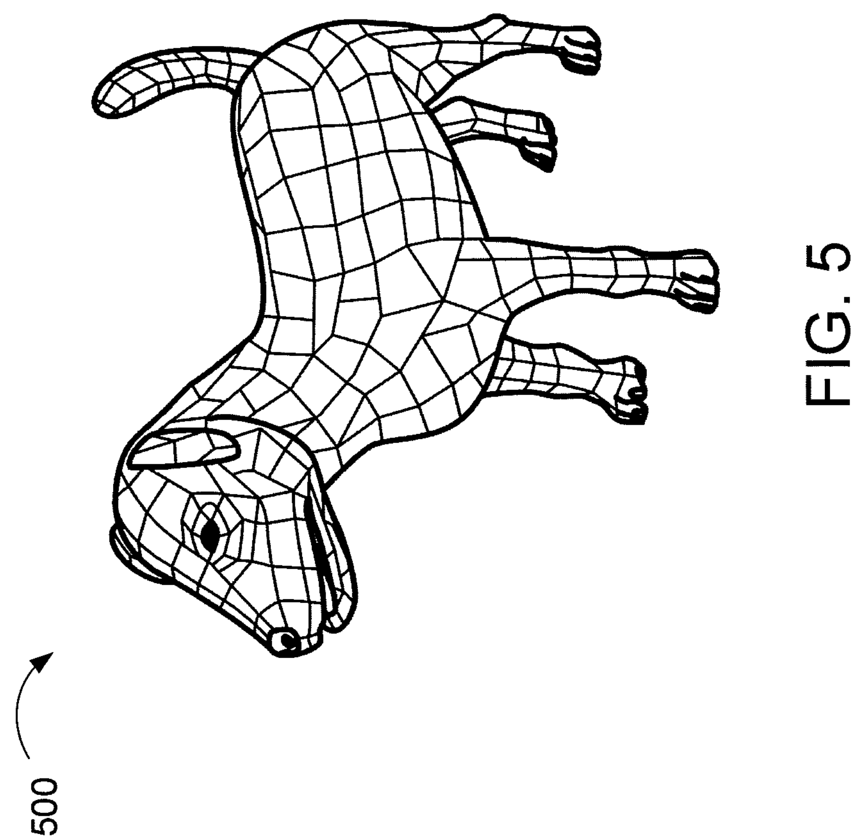
FIG. 5 is an example of a polygonal mesh representing an object, according to one embodiment.

FIG. 5 is an example of a polygonal mesh 500, according to one embodiment. As described, the polygonal mesh 500 may correspond to an artist-authored object. In the example shown, the polygonal mesh 500 represents a dog. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles). In one embodiment, the vertices of each face of the polygonal mesh 500 are planar (i.e., each face is a flat surface). In other embodiments, some of the faces of the polygonal mesh 500 have vertices that are not co-planar (i.e., the face is warped in 3D space and is not a flat surface).

As described, in some embodiments, multiple polygonal meshes can be authored for the same object, for example, in different poses. Continuing with the example polygonal mesh 500 in FIG. 5 representing a dog standing, another polygonal mesh representing the dog in other poses can be authored by an artist, such as a polygonal mesh of the dog sitting on its hind legs or a polygonal mesh of the dog laying down. As described, the multiple polygonal meshes have the same authored topology, but different geometry. In other words, a given face in one polygonal mesh may have a different shape than the same face in another polygonal mesh.

In some embodiments, for any non-planar face to be triangulated, the face is first projected to a two-dimensional (2D) shape. In one implementation, a vertex normal is determined for each vertex of the face. An average vertex normal is computed among the vertex normals of the vertices of the face. The face can then be projected to a 2D shape in the direction of the average vertex normal, resulting in a planar shape to be triangulated.

Figure 6B:
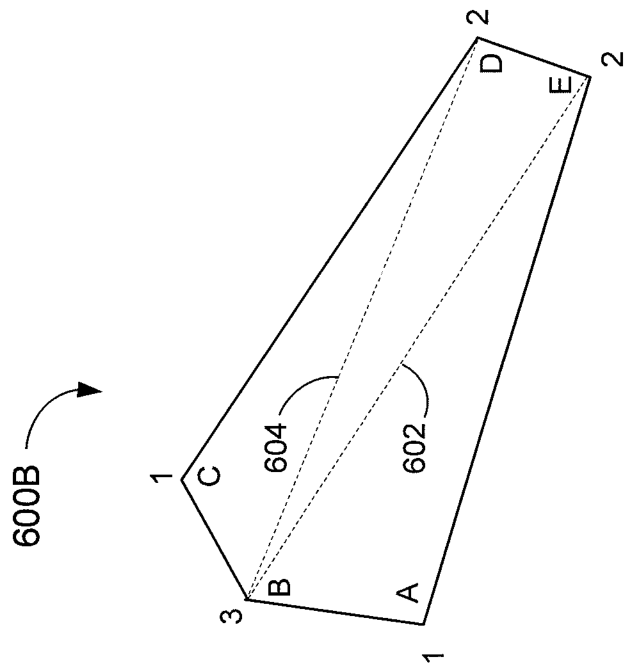
FIGS. 6A-6B illustrate examples of a face having a different shape in two different polygonal meshes, according to one embodiment.
Figure 6A:
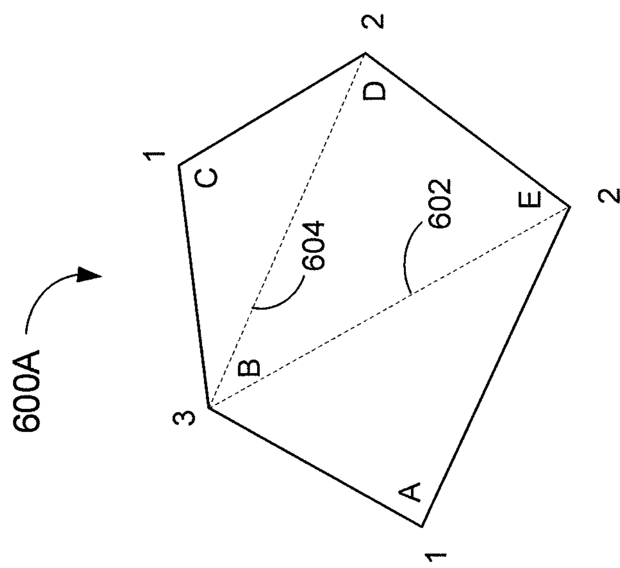

FIGS. 6A-6B illustrate examples of a face having a different shape in two different polygonal meshes, according to one embodiment.

As described, multiple polygonal meshes can be authored having the same authored topology, but different geometry. As such, a given face in one polygonal mesh may have a different shape than the same face in another polygonal mesh.

FIG. 6A illustrates a face 600A having five vertices A, B, C, D, E. The five-sided face 600A can be triangulated by adding edge 602 between vertices B and E, and adding edge 604 between vertices B and D.

FIG. 6B illustrates face 600B having the same five vertices A, B, C, D, E as the face 600A in FIG. 6A, but the face 600B is from a different polygonal mesh than the face 600A. The different polygonal meshes including faces 600A, 600B may represent the same object or character, but authored in different poses. In some embodiments, in order to triangulate face 600B consistently with face 600A, the same edge 602 between vertices B and E and the same edge 604 between vertices B and D can be used to triangulate face 600B. As shown in the example in FIGS. 6A-6B, the face 600B is a warped version of face 600A. If the specific triangulation by adding edges 602, 604 is not consistently applied to face 600B, perhaps a different triangulation could be generated for face 600B at render time (such as, for example, by adding one edge between vertices A and C, and adding another edge between vertices C and E). As discussed herein, embodiments of the disclosure select a triangulation for a given face and store triangulation information in a per-element property (such as a face-vertex property), so that the same triangulation can then be applied to the given face in another polygonal mesh representing the same object.

Figure 7:
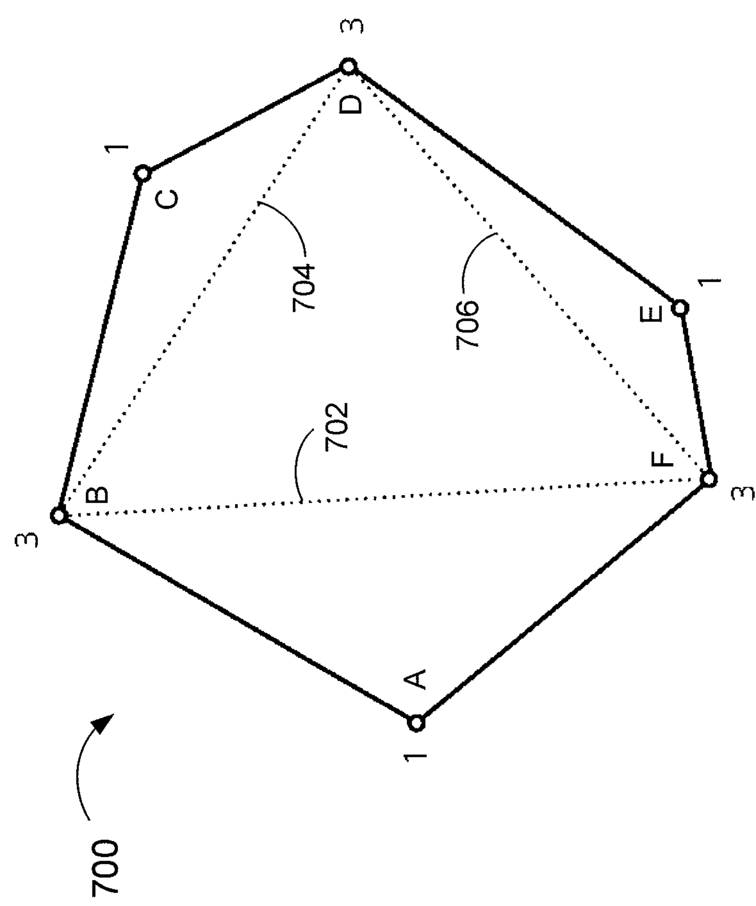
FIG. 7 illustrates a triangulated face with per-element triangulation properties, according to one embodiment.

FIG. 7 illustrates a triangulated face 700 with per-element triangulation properties, according to one embodiment. As shown, the face 700 includes six vertices A, B, C, D, E, F. The face 700 can be triangulated using any triangulation algorithm.

In one embodiment, the face 700 can be triangulated using a triangle fan. Triangulation using a triangle fan results in a triangulation where all triangles of the triangulation share a common vertex. A triangle fan can best be used on convex polygons. A convex polygon is a polygon that is the boundary of a convex set. This means that a line segment between two vertices of the polygon is contained in the union of the interior and the boundary of the polygon. A polygon that is not convex is a concave polygon. A concave polygon will always have at least one reflex interior angle; that is, an angle with a measure that is between 180 degrees and 360 degrees exclusive. Using a triangle fan for concave polygons can result in an incorrect or invalid triangulation by crossing the border of the polygon.

In another embodiment, the face 700 can triangulated by Delaunay triangulation. Delaunay triangulation attempts to maximize the minimum of all the angles of the triangles in the triangulation and to avoid sliver triangles (i.e., triangles with one or two extremely acute angles, thus a long, thin shape than can have undesirable properties during some interpolation or rasterization processes). Delaunay triangulation can be visualized by drawing a circumcircle that includes the three vertices of a possible triangle. No other vertices should be within the circumcircle to provide a valid triangulation according to Delaunay triangulation.

Other triangulation techniques are also within the scope of the disclosure, such as triangulating using a triangle strip.

In the example shown in FIG. 7, the face 700 is triangulated by creating edge 702 between vertices B and F, creating edge 704 between vertices B and D, and creating edge 706 between vertices D and F. The triangulation of face 700 can be stored as a per-vertex property of the face 700. As shown in FIG. 7, for each vertex, an integer count of the number of triangles incident on the vertex in the triangulation is stored. For example, one (1) triangle is incident on vertex A, three (3) triangles are incident on vertex B, one (1) triangle is incident on vertex C, three (3) triangles are incident on vertex D, one (1) triangle is incident on vertex E, and three (3) triangles are incident on vertex F. The per-vertex integer count of the triangles incident on the respective vertices can later be used to deterministically identify the triangulation for the polygon, as described below. The same per-vertex counts can also be stored for the same face but in a different polygonal mesh representing the same object, so that the face is consistently triangulated across the multiple polygonal meshes representing the object.

Maintaining consistent triangulation across the multiple polygonal meshes is used, in some embodiments, because non-triangular faces can often be triangulated in a number of different ways, and triangulation algorithms are often highly sensitive to numerical noise and arithmetic error, such as in marginal cases where either of two or more alternative triangulations are equally desirable. Where non-triangular faces are strictly convex, they can be triangulated with simple triangle fans, for example. But where non-triangular faces are concave, the non-triangular faces are triangulated with more sophisticated triangulation schemes, such as Delaunay triangulation, which can triangulate concave polygons robustly. Since Delaunay triangulation picks triangles to maximize a metric of triangle quality, such triangulation can prefer one or other possible triangulations depending on the geometric shape of the polygon. Since the triangulation selected, e.g., in marginal cases, may depend on arithmetic noise, it can be hard to reliably prefer a particular triangulation if we simply let triangulation proceed naively for each polygonal mesh of the multiple polygonal meshes at render time.

Figure 8:
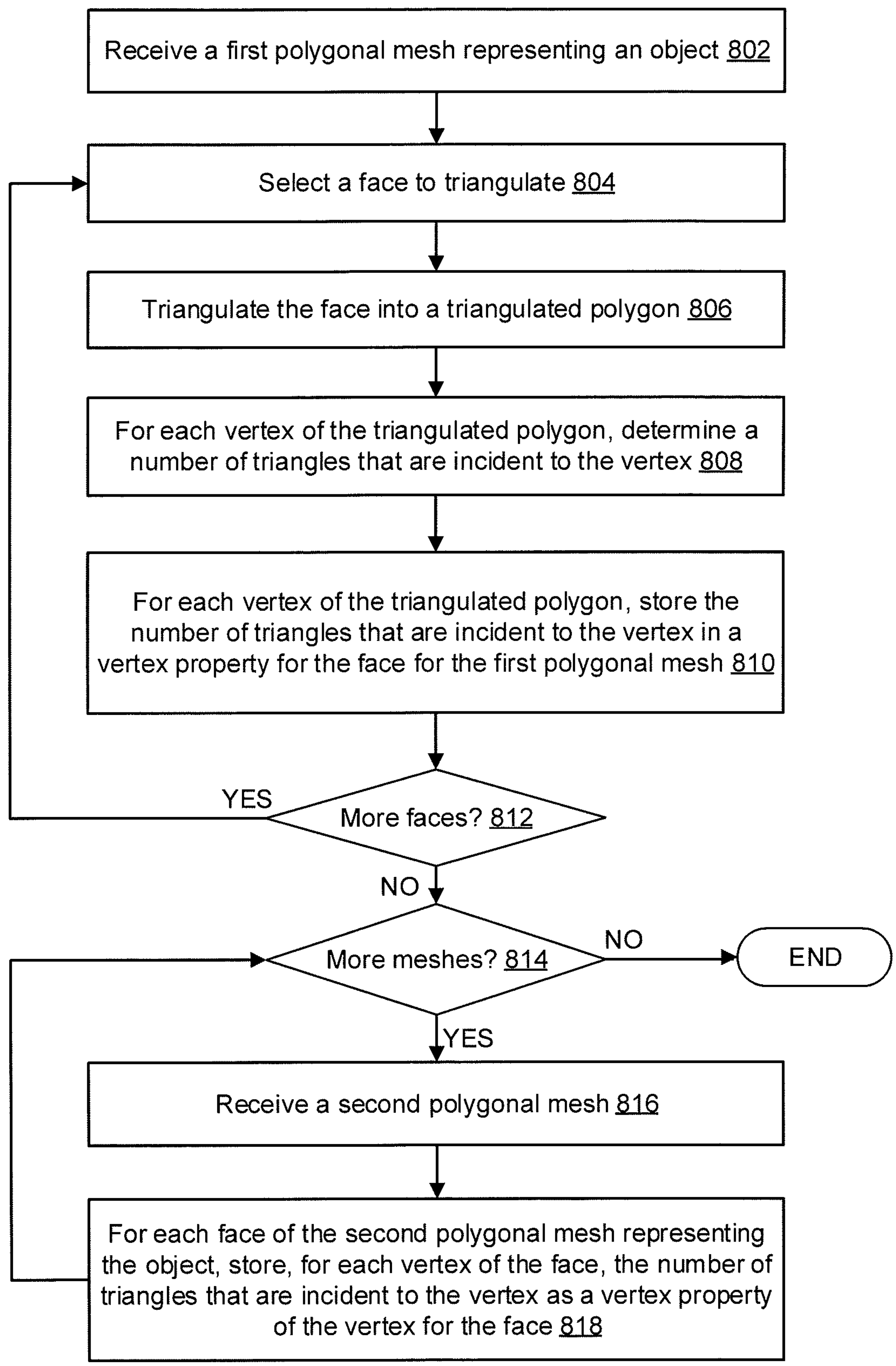
FIG. 8 is a flow diagram of method steps for storing triangulations of multiple polygonal meshes, according to one embodiment.

FIG. 8 is a flow diagram of method steps for storing triangulations of multiple polygonal meshes, according to one embodiment. In various implementations, the method can be performed by the processor 110, the graphics processor 116, or a combination of the processor 110 and the graphics processor 116.

As shown, the method begins at step 802, where the processor receives an input polygonal mesh representing an object. In some embodiments, the input polygonal mesh may be one polygonal mesh among multiple polygonal meshes representing the same object, where each different polygonal mesh has the same authored topology, but different geometry (i.e., same faces, vertices, and connections between vertices, but a morphed version of the same polygonal mesh).

At step 804, the processor selects a face to triangulate. At step 806, the processor triangulates the face into a triangulated polygon. In some embodiments, the face may be non-planar, so the face should first be projected to a 2D shape before being triangulated. Any triangulation algorithm is within the scope of the disclosure, including fan triangulation, Delaunay triangulation, or others.

Any triangle faces do not need to be triangulated as they are already triangles, thus step 806 can be skipped for any triangle faces, and the triangle face can be considered the triangulated polygon.

At step 808, for each vertex of the triangulated polygon, the processor determines a number of triangles that are incident to the vertex. An example in shown in FIG. 7, where the number of triangles after triangulation that is incident on each vertex is shown next to the respective vertex (for example, A:1, B:3, C:1, D:3, E:1, F:3 in FIG. 7). For any triangle faces, the count of the number of triangles incident on each of the three vertices is set to 1.

At step 810, for each vertex of the triangulated polygon, the processor stores the number of triangles that are incident to the vertex in a vertex property for the face for the first polygonal mesh. The number of triangles can be stored as an integer value per vertex, per face.

Storing a single chosen triangulation of each face of a polygonal mesh can be done in a variety of implementations. If efficiency is not a concern, in one embodiment, a linked list of one or more triangles is associated with each face, where each triangle is described as a triple of indices into the vertex list of the face (or alternatively the whole polygonal mesh). However, storing an explicit list of triangles per face can be inefficient since the number of triangles in each list depends on the number of edges in the face (e.g., one for a triangular face, two for a quadrilateral, three for a five-sided face, and so on). Aside from the storage needed to store the lists, there is an inefficiency in processing that arises from the fact that the lists are variable size, making the storage irregular and thus more complex.

In one embodiment, the number of triangles incident on each vertex can be stored in face-vertex properties of integer type, which store a single value for each vertex of each face. In such a data structure, instead of storing a single value per vertex, or a single value per face, a single value is stored for each vertex for the face in which the vertex is referenced. Effectively, each face has its own set of values for the vertices of the face. This kind of property is very useful in computer graphics applications, where surfaces are represented with texturing and shading. In a polygonal mesh, the multiple faces incident to a single vertex may be in different surfaces, thus shaded and textured differently. For this reason, one texture coordinate and one normal is associated with the vertex in one of its faces, but a different texture coordinate and different normal is associated with the same vertex in another face. A face-vertex data structure allows complex models to be represented with hard-shaded edges and different textures on different faces.

In one embodiment, the number of triangles incident on each vertex of a face can be stored in a half-edge data structure. The half-edge data structure is a specialized mesh data structure that allows for the storage of polygonal meshes with constant time access for all local topology queries (e.g., next edge in face, other vertex in edge, opposite face on edge, next face around vertex, etc.), in exchange for a limitation on mesh complexity. Specifically, the half-edge data structure can only represent manifold meshes, in which each edge is incident to at most two faces, forming a simple surface. More accurately, each edge is composed of two half-edges with opposite orientation, and each half-edge can be incident to at most one face. Given this limitation, the half-edge structure allows us to store exactly one value of each type at each edge, vertex, or face. For example, at each vertex, the half-edge data structure stores the index of just one outward half-edge incident to the vertex. At each half-edge, the half-edge data structure stores the index of the single incident face. At each face, the half-edge data structure stores the index of just one of its half-edges. As such, the half-edge data structure can be leveraged to store, for each vertex for each face, the number of triangles incident on the vertex after triangulation of the face. In some embodiments, for example, the triangle counts could be associated with the half-edges that start at each vertex within the face.

Such face-vertex properties, or attributes, are already widely supported by graphics applications, which allows the number of triangles incident on the vertex after triangulation to be stored without adding any specialized storage, and can even be used in third-party polygonal mesh types not under proprietary control.

At step 812, the processor determines whether there are any more faces of the first polygonal mesh to process. If yes, the method returns to step 804 above. If no, the method proceeds to step 814.

At step 814, the processor determines whether there are any more polygonal meshes to import that represent the object. If no, the method terminates. If yes, the method proceeds to step 816.

At step 816, the processor receives a second polygonal mesh. As described, an object can be authored as two or more different polygonal meshes having the same authored topology, but different geometry.

At step 818, for each face of the second polygonal mesh representing the object, the processor stores, for each vertex of the face, the number of triangles that are incident to the vertex as a vertex property of the vertex for the face. As described, this integer count has previously been determined by a particular triangulation for each face of the first polygonal mesh. The same face-vertex properties are stored for the second polygonal mesh as for the first polygonal mesh, thus ensuring consistent triangulation of faces across the multiple polygonal meshes.

After step 818, the method returns to step 814 described above, where the processor determines whether there are any more polygonal meshes to import that represent the object.

Figure 9:
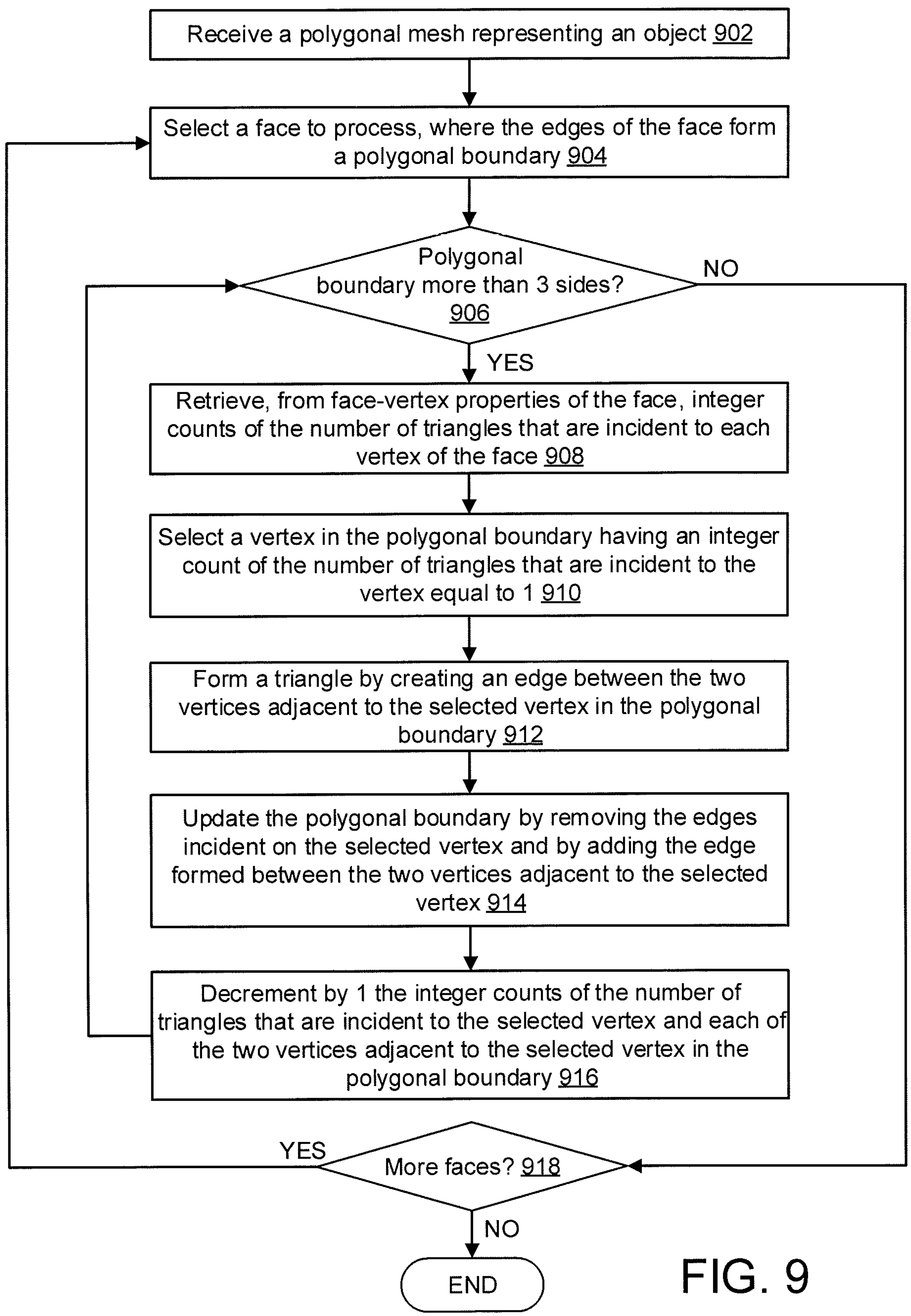
FIG. 9 is a flow diagram of method steps for retrieving a stored triangulation of a polygonal mesh, according to one embodiment.

FIG. 9 is a flow diagram of method steps for retrieving a stored triangulation of a polygonal mesh, according to one embodiment. In various implementations, the method can be performed by the processor 110, the graphics processor 116, or a combination of the processor 110 and the graphics processor 116.

As shown, the method begins at step 902, where the processor receives a polygonal mesh representing an object. At step 904, the processor selects a face to process, where the edges of the face form a polygonal boundary. The polygonal boundary represents the part of the face not yet accounted for by created triangles, which is initially just the whole face, and can be represented by a simple circular list of vertex indices.

At step 906, the processor determines whether the polygonal boundary has more than three sides. If the processor determines that the polygonal boundary does not have more than three sides, then the polygonal boundary forms a triangle, thus triangulation is complete for the face. Each vertex of the triangle face would be associated with a face-vertex property that indicates that one triangle is incident on the vertex. As such, the method identifies that the triangulation is complete, and decrements the integer counts of the three vertices by 1, and proceeds to step 918.

If, at step 906, the processor determines that the polygonal boundary has more than 3 sides, then at step 908, the processor retrieves, from face-vertex properties of the face, integer counts of the number of triangles that are incident to each vertex of the face. The initial values of the integer counts of the number of triangles that are incident to each vertex of the face in the triangulation can be stored using the method of FIG. 8. In one embodiment, the stored counts at the vertices of the face are stored into a new array (or lookup table) whose values can be decremented without affecting the stored values. Note that initially these counts are all positive and non-zero.

Figure 10B:
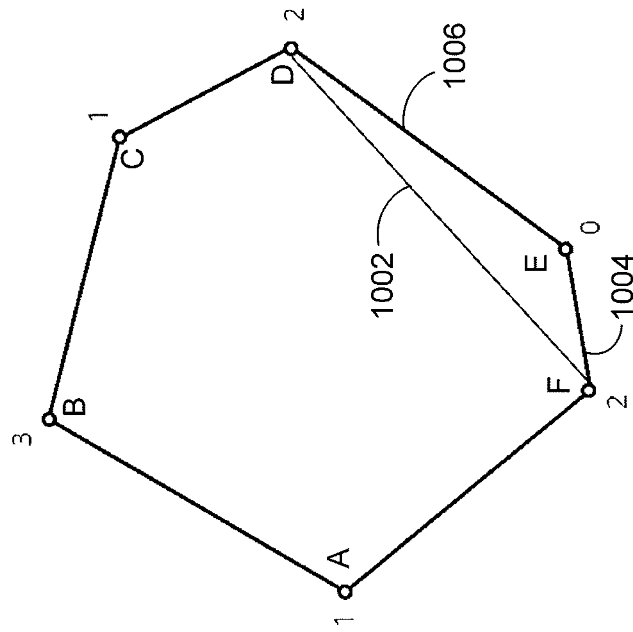
FIGS. 10A-10E are conceptual diagrams illustrating retrieving a stored triangulation of a polygonal mesh, according to one embodiment.
Figure 10A:
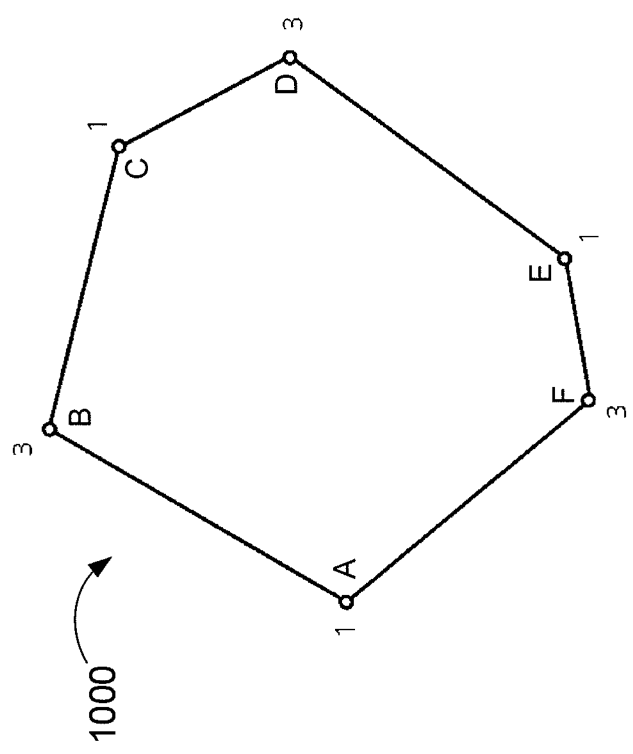

FIGS. 10A-10E are conceptual diagrams illustrating retrieving a stored triangulation of a polygonal mesh, according to one embodiment. FIG. 10A is conceptual diagrams illustrating a face 1000 of a polygonal mesh, where each vertex of the face is associated with a vertex property identifying the number of triangles that are incident to the vertex in the stored triangulation, according to one embodiment. The face 1000 includes vertices A, B, C, D, E, F.

Referring back to FIG. 9, at step 910, the processor selects a vertex in the polygonal boundary having an integer count of the number of triangles that are incident to the vertex equal to 1. As shown in the example in FIG. 10B, vertex E has a count equal to 1 and is selected. In some embodiments, if there are multiple vertices with an integer count equal to 1, any of such vertices can be selected.

At step 912, the processor forms a triangle by creating an edge between the two vertices adjacent to the selected vertex in the polygonal boundary. As shown in the example in FIG. 10B, edge 1002 is created between vertices D and F, which are the two vertices adjacent to vertex E in the polygonal boundary, which initially includes all of the edges of the face 1000. According to embodiments of the disclosure, a triangle referencing a given vertex (i.e., the vertex represented by the integer count of 1) must include the two adjacent vertices by virtue of the fact that it is a triangle and can only involve the two edges of the boundary incident to the vertex. This property is what makes the stored triangulation able to deterministically identify the stored triangulation of a face.

At step 914, the processor updates the polygonal boundary by removing the edges incident on the selected vertex and by adding the edge formed between the two vertices adjacent to the selected vertex. Referring back to FIG. 10B, the updated polygonal boundary for the face removes the edge 1004 between vertices E and F, removes the edge 1006 between vertices E and D, and adds edge 1002 between vertices D and F.

At step 916, the processor decrements by 1 the integer counts of the number of triangles that are incident to the selected vertex and each of the two vertices adjacent to the selected vertex in the polygonal boundary. As shown in FIG. 10B, the integer counts of vertex E and its adjacent vertices D and F (i.e., the three vertices in the newly formed triangle in the triangulation) are decremented by one. In the example shown, the integer count of vertex E is decremented from 1 to 0, the integer count of vertex D is decremented from 3 to 2, and the integer count of vertex F is decremented from 3 to 2. The integer counts of vertices A, B, C are unchanged in this step.

After step 916, the method returns to step 906, where the processor determines whether the polygonal boundary (as now updated) has more than 3 sides. Continuing with the example in FIG. 10B, as described, the polygonal boundary was updated at step 914 to remove the edge 1004 between vertices E and F, remove the edge 1006 between vertices E and D, and add edge 1002 between vertices D and F. As such, the updated polygonal boundary still includes more than 3 sides, thus the method continues to step 908.

Figure 10E:
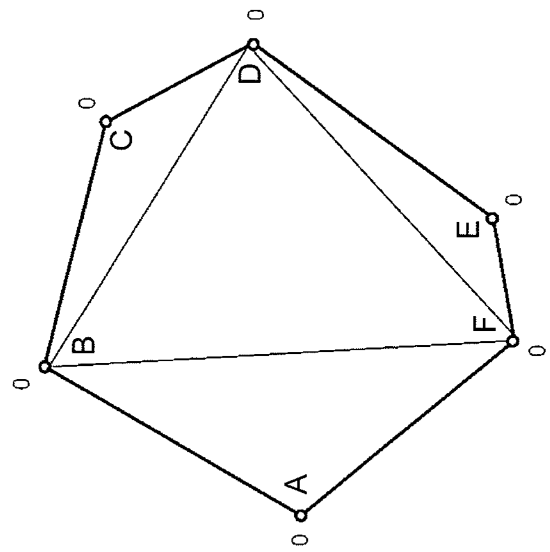
Figure 10D:
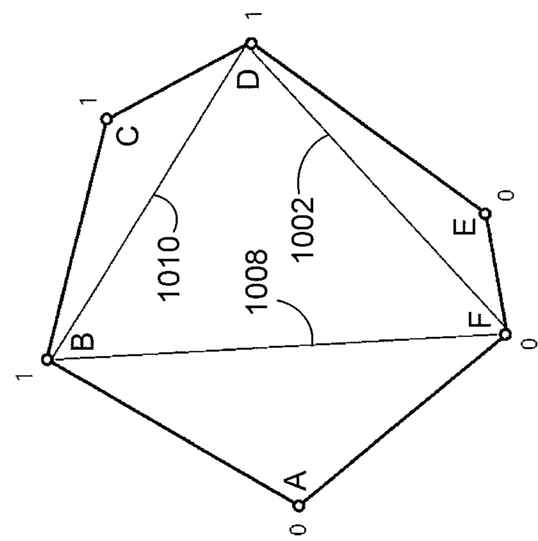
Figure 10C:
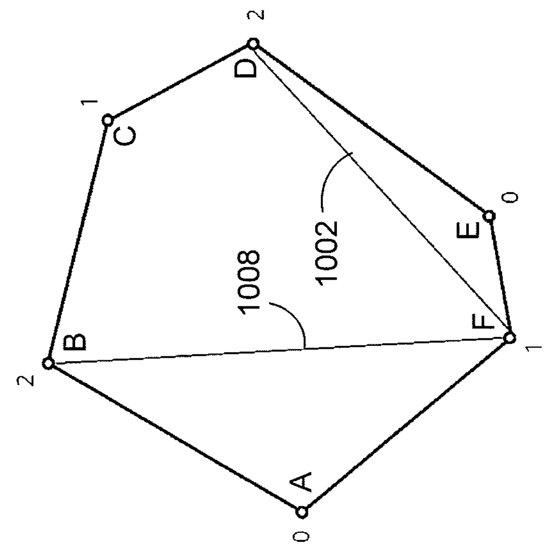

Referring to FIG. 10C, another vertex is selected that has an integer count of 1 for the number of triangles that are incident to the vertex, which is selected as vertex A in FIG. 10C. Edge 1008 is added to the triangulation, and the integer counts of vertices A, B, and F are decremented by 1.

Continuing to cycle through steps 906, 908, 910, 912, 914, and 916, in the next iteration, as shown in FIG. 10D, another vertex is selected that has an integer count of 1 for the number of triangles that are incident to the vertex, which is selected as vertex F in FIG. 10D. Edge 1010 is added to the triangulation, and the integer counts of vertices F, B, and D are decremented by 1.

When the method returns to step 906, the processor determines that the updated polygonal boundary now includes three sides. In FIG. 10D, the updated polygonal boundary includes the three edges connecting vertices B, C, and D, each of which has an integer count of 1. As such, the method identifies that the triangulation is complete, and decrements the integer counts of the three remaining vertices by 1 (i.e., as shown in FIG. 10E, where all vertices have an integer count of 0), and proceeds to step 918.

At step 918, the processor determines whether there are any more faces to process. Each face effectively stores a complete set of values for the vertices of the face, independent from the values stored for those vertices by other faces. If the processor determines that there are more faces to process, the method returns to step 904, where another face is selected for processing. If the processor determines that there are no more faces to process, then the method terminates.

In this manner, embodiments of the disclosure are able to store a specific triangulation of a polygonal mesh in face-vertex properties. The same triangulation can be stored in face-vertex properties in each polygonal mesh of multiple polygonal meshes that represent the same object. When a rendering system or other graphics processing system needs to triangulate the multiple polygonal meshes and index into the common triangulations consistently, the rendering system or other graphics processing system can determine the triangulation by retrieving the stored triangulation from the face-vertex properties, as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for retrieving a stored triangulation of a polygonal mesh, the method comprising:

receiving, by one or more processors, an input polygonal mesh that is a computer representation of a three-dimensional (3D) object;

identifying, by the one or more processors, one or more faces of the input polygonal mesh that have more than three edges;

retrieving, by the one or more processors, for each face of the one or more faces, integer counts of a number of triangles that are incident to each vertex of the face stored in face-vertex properties of the face, wherein a specific triangulation of the face is represented by the number of triangles that are incident to each vertex of the face; and generating a triangulated polygonal mesh corresponding to the input polygonal mesh by triangulating, by the one or more processors, for each face of the one or more faces, the face based on the integer counts of the number of triangles that are incident to each vertex of the face stored in the face-vertex properties;

wherein for each face of the one or more faces of the input polygonal mesh, edges of the face form a polygonal boundary for the face; and wherein generating the triangulated polygonal mesh corresponding to the input polygonal mesh comprises:

for a first face of the one or more faces:

selecting, by the one or more processors, a first vertex in the polygonal boundary of the first face having an integer count of the number of triangles that are incident to the first vertex equal to 1;

forming, by the one or more processors, a triangle by creating an edge between a second vertex and a third vertex of the first face, wherein the second vertex and the third vertex are adjacent vertices to the first vertex in the polygonal boundary of the first face;

updating, by the one or more processors, the polygonal boundary of the first face by removing edges incident on the first vertex from the polygonal boundary and adding the edge formed between the second vertex and the third vertex to the polygonal boundary; and decrementing by 1, by the one or more processors, the integer counts of the number of triangles that are incident to the first vertex, the second vertex, and the third vertex.

2. The method according to claim 1, wherein the face-vertex properties of the face are stored in a half-edge data structure.

3. The method according to claim 1, wherein the input polygonal mesh is one of multiple polygonal meshes each being a computer representation of the same 3D object, wherein each polygonal mesh of the multiple polygonal meshes is a geometrically distorted version having the same topology.

4. The method according to claim 3, wherein for corresponding faces among the multiple polygonal meshes, the integer counts of the number of triangles that are incident to each vertex of the face stored in the face-vertex properties of the face are the same, representing the same specific triangulation of the faces among the multiple polygonal meshes.

5. The method according to claim 1, further comprising:

for each face of the one or more faces of the input polygonal mesh, storing, by the one or more processors, the integer counts of the number of triangles that are incident to each vertex of the face in the face-vertex properties of the face, comprising:

selecting, by the one or more processors, the first face of the input polygonal mesh;

triangulating, by the one or more processors, the first face using a triangulation algorithm; and storing, by the one or more processors, the integer counts of the number of triangles that are incident to each vertex of the first face in the face-vertex properties of the first face based on the triangulating.

6. The method according to claim 5, wherein the triangulation algorithm comprises a triangle fan algorithm or a Delaunay triangulation algorithm.

7. The method according to claim 5, wherein triangulating the first face using the triangulation algorithm comprises:

determining, by the one or more processors, that vertices of the first face are not co-planar;

determining, by the one or more processors, a vertex normal for each vertex of the first face;

computing, by the one or more processors, an average vertex normal among the vertex normals for the vertices of the first face;

projecting, by the one or more processors, the first face to a two-dimensional (2D) shape in a direction of the average vertex normal; and triangulating, by the one or more processors, the 2D shape using the triangulation algorithm.

8. A non-transitory computer-readable storage medium storing instructions that, when executed by one or more processors, causes a computing device to retrieve a stored triangulation of a polygonal mesh, by performing the steps of:

receiving an input polygonal mesh that is a computer representation of a three-dimensional (3D) object;

identifying one or more faces of the input polygonal mesh that have more than three edges;

retrieving for each face of the one or more faces, integer counts of a number of triangles that are incident to each vertex of the face stored in face-vertex properties of the face, wherein a specific triangulation of the face is represented by the number of triangles that are incident to each vertex of the face; and generating a triangulated polygonal mesh corresponding to the input polygonal mesh by triangulating, for each face of the one or more faces, the face based on the integer counts of the number of triangles that are incident to each vertex of the face stored in the face-vertex properties;

wherein for each face of the one or more faces of the input polygonal mesh, edges of the face form a polygonal boundary for the face; and wherein generating the triangulated polygonal mesh corresponding to the input polygonal mesh comprises:

for a first face of the one or more faces:

selecting a first vertex in the polygonal boundary of the first face having an integer count of the number of triangles that are incident to the first vertex equal to 1;

forming a triangle by creating an edge between a second vertex and a third vertex of the first face, wherein the second vertex and the third vertex are adjacent vertices to the first vertex in the polygonal boundary of the first face;

updating the polygonal boundary of the first face by removing edges incident on the first vertex from the polygonal boundary and adding the edge formed between the second vertex and the third vertex to the polygonal boundary; and decrementing by 1 the integer counts of the number of triangles that are incident to the first vertex, the second vertex, and the third vertex.

9. The computer-readable storage medium according to claim 8, wherein the face-vertex properties of the face are stored in a half-edge data structure.

10. The computer-readable storage medium according to claim 8, wherein the input polygonal mesh is one of multiple polygonal meshes each being a computer representation of the same 3D object, wherein each polygonal mesh of the multiple polygonal meshes is a geometrically distorted version having the same topology.

11. The computer-readable storage medium according to claim 10, wherein for corresponding faces among the multiple polygonal meshes, the integer counts of the number of triangles that are incident to each vertex of the face stored in the face-vertex properties of the face are the same, representing the same specific triangulation of the faces among the multiple polygonal meshes.

12. The computer-readable storage medium according to claim 8, further comprising:

for each face of the one or more faces of the input polygonal mesh, storing the integer counts of the number of triangles that are incident to each vertex of the face in the face-vertex properties of the face, comprising:

selecting the first face of the input polygonal mesh;

triangulating the first face using a triangulation algorithm; and storing the integer counts of the number of triangles that are incident to each vertex of the first face in the face-vertex properties of the first face based on the triangulating.

13. The computer-readable storage medium according to claim 12, wherein the triangulation algorithm comprises a triangle fan algorithm or a Delaunay triangulation algorithm.

14. The computer-readable storage medium according to claim 12, wherein triangulating the first face using the triangulation algorithm comprises:

determining that vertices of the first face are not coplanar;

determining a vertex normal for each vertex of the first face;

computing an average vertex normal among the vertex normals for the vertices of the first face;

projecting the first face to a two-dimensional (2D) shape in a direction of the average vertex normal; and triangulating the 2D shape using the triangulation algorithm.

15. A device for retrieving a stored triangulation of a polygonal mesh, the device comprising:

a memory storing instructions; and one or more processors configured to the execute the instructions to cause the device to:

receive an input polygonal mesh that is a computer representation of a three-dimensional (3D) object;

identify one or more faces of the input polygonal mesh that have more than three edges;

retrieve for each face of the one or more faces, integer counts of a number of triangles that are incident to each vertex of the face stored in face-vertex properties of the face, wherein a specific triangulation of the face is represented by the number of triangles that are incident to each vertex of the face; and generate a triangulated polygonal mesh corresponding to the input polygonal mesh by triangulating, for each face of the one or more faces, the face based on the integer counts of the number of triangles that are incident to each vertex of the face stored in the face-vertex properties;

wherein for each face of the one or more faces of the input polygonal mesh, edges of the face form a polygonal boundary for the face; and wherein generating the triangulated polygonal mesh corresponding to the input polygonal mesh comprises:

for a first face of the one or more faces:

selecting a first vertex in the polygonal boundary of the first face having an integer count of the number of triangles that are incident to the first vertex equal to 1;

forming a triangle by creating an edge between a second vertex and a third vertex of the first face, wherein the second vertex and the third vertex are adjacent vertices to the first vertex in the polygonal boundary of the first face;

updating the polygonal boundary of the first face by removing edges incident on the first vertex from the polygonal boundary and adding the edge formed between the second vertex and the third vertex to the polygonal boundary; and decrementing by 1 the integer counts of the number of triangles that are incident to the first vertex, the second vertex, and the third vertex.

16. The device according to claim 15, wherein the input polygonal mesh is one of multiple polygonal meshes each being a computer representation of the same 3D object, wherein each polygonal mesh of the multiple polygonal meshes is a geometrically distorted version having the same topology; and wherein for corresponding faces among the multiple polygonal meshes, the integer counts of the number of triangles that are incident to each vertex of the face stored in the face-vertex properties of the face are the same, representing the same specific triangulation of the faces among the multiple polygonal meshes.

17. The device according to claim 15, further comprising:

for each face of the one or more faces of the input polygonal mesh, storing the integer counts of the number of triangles that are incident to each vertex of the face in the face-vertex properties of the face, comprising:

selecting the first face of the input polygonal mesh;

triangulating the first face using a triangulation algorithm, wherein the triangulation algorithm comprises a triangle fan algorithm or a Delaunay triangulation algorithm; and storing the integer counts of the number of triangles that are incident to each vertex of the first face in the face-vertex properties of the first face based on the triangulating.

* * * * *